United States Patent [19]

Oughton

[11] 4,208,260

[45] Jun. 17, 1980

[54] TREATMENT OF COMMINUTED PROTEINACEOUS MATERIAL UNDER THE INFLUENCE OF AN ELECTRIC FIELD

[75] Inventor: Richard W. Oughton, Odessa, Canada

[73] Assignee: Du Pont of Canada, Limited, Montreal, Canada

[21] Appl. No.: 35,646

[22] Filed: May 3, 1979

[30] Foreign Application Priority Data

May 9, 1978 [GB] United Kingdom ............... 18540/78

[51] Int. Cl.² ........................... B03C 5/00; A23J 1/12
[52] U.S. Cl. ................................ 204/180 R; 204/186;
260/112 G; 260/112 R; 260/123.5; 426/436;
426/463; 426/656
[58] Field of Search ................... 204/180 R, 186, 188,
204/299 R, 300 R; 260/112 G, 112 R, 123.5;
426/436, 463, 656

[56] References Cited

U.S. PATENT DOCUMENTS

| | | | |
|---|---|---|---|
| 1,229,203 | 6/1917 | Schwerin | 204/180 R |
| 2,485,335 | 10/1949 | Tyson | 204/180 R |
| 2,900,320 | 8/1959 | Metcalfe et al. | 204/180 R X |
| 2,944,952 | 7/1960 | McMinn, Jr. | 204/180 R |
| 3,556,969 | 1/1971 | Mizuguchi et al. | 204/180 R X |
| 3,642,605 | 2/1972 | Chenel et al. | 204/300 R |
| 3,828,017 | 8/1974 | Finley et al. | 260/123.5 X |
| 3,869,438 | 3/1975 | Finley et al. | 260/123.5 |
| 4,053,492 | 10/1977 | Boocock et al. | 260/123.5 X |
| 4,064,119 | 12/1977 | Kruseman | 260/123.5 |
| 4,089,848 | 5/1978 | Bell et al. | 426/656 X |

*Primary Examiner*—Arthur C. Prescott

[57] ABSTRACT

A process for the separation of comminuted proteinaceous material from an admixture thereof with solvent is disclosed. An admixture of the material and the solvent is subjected to a high voltage electric field between an anode and a cathode, thereby depositing at least part of the material on at least the anode. The solvent is an aliphatic hydrocarbon containing from 5 to 8 carbon atoms or a normally liquid chlorofluorocarbon containing 1 or 2 carbon atoms. The proteinaceous material may be wheat, rye, barley, triticale, rice, peas, beans, soya beans, sesame seeds, peanuts, sunflower seeds, whey powder, corn, rapeseed, sorghum, flax and buckwheat. In an embodiment the fraction is in the form of a dispersion, e.g. fines, in the solvent.

23 Claims, No Drawings

TREATMENT OF COMMINUTED PROTEINACEOUS MATERIAL UNDER THE INFLUENCE OF AN ELECTRIC FIELD

The present invention relates to a process for the treatment of comminuted proteinaceous material and especially to a process for the treatment of comminuted proteinaceous material under the influence of an electric field. In particular the invention relates to the treatment of admixtures of comminuted proteinaceous material and a solvent, especially a hydrocarbon solvent, for oil in the proteinaceous material, such admixtures being treated under the influence of an electric field.

As used herein proteinaceous material consists of wheat, rye, barley, triticale, rice, peas, beans, soya beans, sesame seeds, peanuts, sunflower seeds, whey powder, corn, rapeseed, sorghum, flax and buckwheat. The outer coat of the cereal grains viz wheat, rye, barley and triticale is also known as bran, such bran may have endosperm attached thereto, whereas the outer coat of peas, beans and buckwheat is also known as the seed coat. The endosperm of peas and beans is also known as the cotyledon. For the cereal grains and buckwheat the endosperm may include the germ. The expression "gum" used herein refers in particular to water-soluble gums, if present in the particular proteinaceous material.

The proteinaceous materials are a potential source of a wide variety of useful products. Examples of such products are flour, starch, protein-enriched and protein-depleted products, bran, gum and oil, depending on the particular proteinaceous material. Traditional techniques used in the food processing industry, if available, for the treatment of proteinaceous material so as to effect the separation of the proteinaceous material into fractions of differing composition are capable of improvement, for example with respect to energy requirements, potential pollution problems and the taste and/or colour of products. In other instances techniques may not be available for the conversion of the proteinaceous material into commercially viable products for example products of increased protein content.

A process for the separation of a flour fraction, a bran fraction and oil from comminuted oats in which gum does not cause significant process problems and in which the flour is essentially free of gum is disclosed in U.S. patent application Ser. No. 695,206 of R. W. Oughton, filed June 11, 1976 now abandoned. A process for the separation of comminuted oats, especially flour fractions, into fractions differing in composition in which the separation occurs under the influence of centrifugal force is disclosed in U.S. patent application Ser. No. 747,734 of R. W. Oughton, filed Dec. 6, 1976. Processes for the separation of proteinaceous materials into fractions differing in composition are disclosed in U.S. patent application Ser. No. 747,733 of R. W. Oughton, filed Dec. 6, 1976 now U.S. Pat. No. 4,154,728.

A process for isolating protein from a pulverized oil seed using liquid fluorocarbons is disclosed in U.S. Pat. No. 3,869,438 of J. W. Finley et al, which issued Mar. 4, 1975. The density separation of protein and carbohydrates from wheat flour, soya beans, green peas and dried acid whey using a non-aqueous solvent system is described by J. W. Finley in Journal of Food Science, 41, 882–885 (1976). Processes for the solvent-extractive milling of maize or corn, wheat, rye and the sorghum grains to remove the bran coat from whole kernels of such grains followed by comminution of the whole milled kernels and for the separation of so-called fibrous, proteinaceous, endosperm and/or starch fractions derived from such grains are disclosed by T. B. Wayne in Canadian Pat. Nos. 864,538, which issued Feb. 23, 1971, and 905,909 and 905,910, both of which issued July 25, 1972.

Techniques for the separation of solid particles from an organic liquid e.g. for the separation of solid particles from a dispersion thereof in organic solvent, are known. For example in U.S. Pat. No. 3,304,251, which issued Feb. 14, 1967, J. Walker et al describe a process for the separation of wax from a dispersion thereof in oil in which the separation involves the use of a non-uniform electric field. The separation is referred to in the patent as dielectrophoresis. It is stated that in order to obtain the separation of the solid particles of wax, the solid particles must have a dielectric constant higher than that of the continuous phase of the dispersion.

Processes for removing electrically conductive materials from hot liquid hydrocarbon feed stock are disclosed in U.S. Pat. Nos. 3,928,158 of G. R. Fritsche et al, which issued Dec. 23, 1975; 4,009,089 of J. H. Crissman et al, which issued Feb. 22, 1977; and 4,022,675 of J. D. Chachere, which issued May 10, 1977. Such processes for removing electrically conductive materials involve passing the feed stock through interstitial spaces defined by non-conducting spherical particles, for example, of glass or ceramics. The spherical particles are located between electrodes across which an electric field is applied. The electrically conductive materials in the feed stock become deposited on the spherical particles from which they may be removed by back-flushing.

The separation of comminuted proteinaceous material, or fractions thereof, from an admixture of such proteinaceous material and hydrocarbon solvent may in general be accomplished by, for example, centrifuging the admixture. However such separation techniques are capable of improvement especially with regard to separation of products in a form that is essentially free from contamination with for example oil of the proteinaceous material in the solvent and/or so that the remaining hydrocarbon solvent miscella has a low level of fines. The presence of fines in a miscella has traditionally been a problem in the processing of oil seeds.

It has now been found that comminuted proteinaceous material, and especially fractions thereof, may be separated from an admixture of such proteinaceous material and an aliphatic hydrocarbon containing 5 to 8 carbon atoms or chlorofluorocarbon containing 1 or 2 carbons as the solvent under the influence of a d.c. electric field and that such separation techniques are capable of providing comminuted proteinaceous material essentially free from contamination with oil of the proteinaceous material and/or with low levels of fines.

Accordingly the present invention provides a process for the separation of a comminuted fraction of proteinaceous material from an admixture thereof with a hydrocarbon or chlorofluorocarbon solvent, said proteinaceous material being selected from the group consisting of wheat, rye, barley, triticale, rice, peas, beans, soya beans, sesame seeds, peanuts, sunflower seed, whey powder, corn, rapeseed, sorghum, flax and buckwheat and said solvent being capable of extracting oil from said proteinaceous material, comprising the steps of:

(a) subjecting the admixture to the influence of a high voltage electric field, said admixture being in the form of a slurry and said electric field being formed between an anode and a cathode, and thereby depositing at least part of the comminuted fraction of proteinaceous material on at least the anode, and (b) separating the part so deposited from said admixture.

In a preferred embodiment of the process of the present invention, the admixture of the comminuted fraction of proteinaceous material and the solvent is a dispersion of said fraction in the solvent.

In another embodiment step (b) is followed by step (c) in which the part so deposited in contacted with solvent essentially free of oil.

In the process of the present invention the comminuted fraction of proteinaceous material that is to be separated is in admixture with a solvent, especially a hydrocarbon solvent, for any oil of the material. Such a solvent will facilitate extraction of oil, if present, from the comminuted fraction of proteinaceous material i.e. the de-oiling of the fraction. The solvent used must be acceptable for use with foodstuffs e.g. be nontoxic at the levels remaining in the products subsequently produced, and not cause the formation of toxic materials in the product and not have a significant deleterious effect on the nutritional value of the product. The amount and type of solvent remaining in products offered for sale must be acceptable to the appropriate health authorities, as will be understood by those skilled in the art. Suitable hydrocarbon solvents are the aliphatic hydrocarbons containing from 5 to 8 carbon atoms. Examples of solvents are pentane, hexane, heptane and cyclohexane, and mixtures thereof; as used herein the solvents hexane and heptane include those solvents referred to in the food industry as hexane and heptane. The preferred solvent is hexane. The present invention will generally be described hereinafter with reference to hexane as the solvent.

Although the process of the present invention is particularly described herein with reference to hydrocarbon solvents, especially hexane, the process may also be operated with normally liquid chlorofluorocarbon solvents containing 1 or 2 carbon atoms, for example, trifluorotrichloroethane which is available under the trademark FREON 113. Such fluorocarbons must be liquid under the conditions at which the process is operated.

In the process of the present invention the proteinaceous materials that are cereal grains or buckwheat are preferably dehulled, if necessary, prior to comminution. Techniques for dehulling cereal grains and buckwheat are known. In addition peas and beans should be separated from their pods. The proteinaceous materials are comminuted in order to facilitate extraction of any oil and to faciliatase separation of a subsequently formed admixture of comminuted proteinaceous material and solvent into fractions differing in composition. The particle size of the comminuted proteinaceous material will depend in particular on the technique to be used to separate the comminuted proteinaceous material in the admixture into fractions and may effect the segregation of protein in the material. Conventional techniques, for example, pinmilling, hammer milling and other shearing techniques would appear to produce an acceptable comminuted proteinaceous material, the preferred techniques depending in particular on the actual separation techniques to be used.

In embodiments of the present invention the admixture of comminuted fraction of proteinaceous material and hexane subjected to the influence of an electric field may be obtained from a variety of sources. For example the admixture may be formed from comminuted proteinaceous material and hexane. In such admixtures the comminuted proteinaceous material may be material that has been comminuted in order to facilitate extraction of oil. The required particle size of the comminuted proteinaceous material will depend primarily on the requirements of other processes to which the comminuted proteinaceous material is to be subjected and on any requirements with respect to the de-oiling of the material.

The admixture may also be an admixture of a comminuted fraction of proteinaceous material and hexane that has been obtained from a step of a process disclosed in the aforementioned U.S. patent application Ser. No. 747,733 of R. W. Oughton. Such an admixture may be for example an admixture of hexane and a fraction of proteinaceous material having a high protein content or an admixture in the form of a dispersion of particles of proteinaceous material in hexane that remains after a slurry of a comminuted fraction of proteinaceous material and hexane has been centrifuged so as to separate the fraction from the hexane.

In the process of the present invention the admixture is usually in the form of a slurry when it is subjected to the influence of the electric field. In particular embodiments of the process the slurry is, in whole or in part, a dispersion of the comminuted fraction of proteinaceous material in hexane.

In the process of the present invention the fraction of proteinaceous material may become deposited on the anode or on both the anode and the cathode while under the influence of the electric field. When the electric field is discontinued the deposited comminuted fraction may or may not remain deposited on the electrode. There appear to be a number of important factors in the deposition of fractions of proteinaceous material on the electrode(s). One factor is the shape of the electrodes. If the electrode is plate-like and in a vertical position the influence of gravity alone will tend to make a deposit less likely to remain on the electrode. Similarly a deposit will have a relative tendency to remain on a sloping electrode, especially an electrode having a lip or the like at the lower edge thereof, or on a horizontal electrode.

Another factor is the nature of the comminuted fraction of proteinaceous material. If the comminuted fraction is for example endosperm, the fraction will tend to become deposited on both electrodes under the influence of the electric field and at least the deposit on the cathode will tend to separate from that electrode when the electric field is discontinued. In contrast comminuted fractions of high protein content may tend to deposit on the anode only and remain on the anode when the influence of the electric field is discontinued. Other factors in the formation and properties of the deposit include the source and preparation of the comminuted fraction, particle size, voltage applied, agitation of the admixture of comminuted fraction and hydrocarbon solvent and nature of the electrodes.

As exemplified hereinafter the electric field to which the admixture is subjected according to the present invention is a high voltage d.c. electric field for example, 1–20 kV/cm and especially 5–15 kV/cm. The d.c.

electric field may be a steady or pulsating d.c. electric field. Higher or lower voltages may however be used.

In one embodiment of the present invention a comminuted fraction of proteinaceous material may be de-oiled. For example, an admixture of such a fraction and hexane, in which the fraction and/or the hexane contain oil from the proteinaceous material, may be subjected to the influence of an electric field in a continuous or batch process. The preferred type of process may depend on the nature of the protein fraction. In a batch process all or part of the comminuted fraction could be deposited on the anode, or anode and cathode, and subsequently the remaining oil-containing solution may be replaced with oil-free hexane to wash the deposit. The technique of replacing the solution with oil-free hexane will depend to some extent on the nature of the deposit, as will be understood by those skilled in the art. In a continuous process the anode could be a moving electrode e.g. a rotating drum or a moving inclined belt, from which the deposit could be removed continuously. The deposit could be washed e.g. by spraying with oil-free hexane prior to being separated from the moving electrode. By judicious choice of, for example, technique, method and amount of washing and repetition of the deposition/washing procedure, the oil content of a comminuted fraction of proteinaceous material may be reduced by substantial amounts.

In another embodiment, fines of proteinaceous material may be removed from an admixture of hexane and a comminuted fraction of proteinaceous material remaining in the form of fines. For example, such an admixture could be in the form of a miscella obtained from a continuous centrifuge in which a comminuted fraction is being separated from hexane. In a centrifugal separation process it is difficult to remove fines effectively from an admixture of hexane and a comminuted fraction of proteinaceous material and, thus, the miscella discharged from the centrifuge usually contains fines. Such a miscella may be subjected to the influence of an electric field according to the present invention in order to remove part or even effectively all of the fines in the miscella. Apart from clarification, the separation of fines from the miscella may be beneficial in subsequent treatment of the miscella e.g. in the recovery of any oil in the miscella and/or in the recovery of hexane for further use.

In a further embodiment of the present invention, a fraction of proteinaceous material having a high protein content may be recovered from an admixture of hexane and a comminuted fraction of proteinaceous material having a high protein content. Such an admixture may be obtained from a variety of sources, for example, using processes disclosed in the aforementioned U.S. patent application Ser. No. 747,733 of R. W. Oughton. Under the influence of the electric field on the admixture, a fraction of high protein content may become deposited on the anode and the cathode may be free of deposit. While the recovery of such a fraction may be operated as a batch or continuous process, the latter is preferred. Preferably, the anode is adapted for the continuous recovery of deposit e.g. it is a rotating drum or moving belt electrode. Recovery of the fraction of proteinaceous material, washed if necessary to remove any adsorbed oil, so as to obtain a clear hexane solution is possible.

In the processes of the present invention the space between electrodes does not contain matter other than the admixture thereby permitting free flow of the admixture between the electrodes. As discussed hereinabove the admixture is usually in the form of a slurry. In specific embodiments, the slurry may be in the form of a dispersion. Extraneous matter between the electrodes may lead to plugging of the apparatus and hence to process problems.

The various processes embodied by the present invention are useful in a variety of ways in the treatment of admixtures of hexane and comminuted fractions of proteinaceous material, as described herein.

The present invention is illustrated by the following examples.

EXAMPLE I 25 g of comminuted preteinaceous material, de-hulled where necessary, were admixed with 250 g of hexane for 3 minutes in a WARING TM blender. The resultant admixture was then decanted into a 400 ml beaker. A cylindrical aluminum foil electrode (cathode) and a centrally located rod anode were placed in the admixture in the beaker. A d.c. electric field of 15 kV (5 kV/cm) was applied across the electrodes.

In all cases proteinaceous material was primarily attracted to the anode. However the deposit formed did not remain on the anode when the electric field was discontinued. In general proteinaceous material was also attracted to the cathode.

Further comments are as follows:

| Proteinaceous Material | Current (mA) | Comments |
|---|---|---|
| Soya Beans | 0.8 | Clear miscella formed but cloudy between electrodes. |
| Sesame Seeds | 0 | Clear miscella formed. |
| Peanuts | 0.05 | Clear miscella formed. |
| Sunflower Seeds | 0.55 | Clear miscella formed. "Spokes" of material formed between the electrodes. |
| Whey | 0 | Miscella not clear. Some "spokes" formed. Large part of material settled to bottom of beaker. |
| Barley | 0.1 | "Spokes" between electrodes. |
| Buckwheat | 0 | Clear miscella formed. All material on anode. |
| Corn | 0 | Miscella cloudy. "Spokes" formed between electrodes. |
| Wheat | 0 | Miscella cloudy. "Spokes", mainly on anode, were formed. Large part of material settled to bottom of beaker. |
| Rapeseed | 0 | Clear miscella formed. "Spokes" formed. On repetition of run on same material, material tended to go to anode only with no "spokes". |
| Rice | 0 | "Spokes" between electrodes. |
| Sorghum | — | Some material attracted to anode, most material settled to bottom of beaker. |

This example illustrates that the process of the present invention is capable of being used to separate proteinaceous material from an admixture thereof with hexane.

EXAMPLE II 100 g of soya beans were admixed with 250 g of hexane for 3 minutes in a WARING blender. A further 750 g of hexane were then added. The resulting admixture was pumped through a glass cylinder equipped with a centrally located rod cathode and a cylindrical wire mesh anode at the circumference of the cylinder. A d.c. electric field of 15 kV (7.5 kV/cm) was applied across the electrodes while the admixture was pumped through the cylinder.

The material in the admixture became deposited, mostly on the anode. The hexane miscella, which contained the oil in soya beans, passing from the cylinder was substantially clear.

The hexane miscella was passed through the cylinder again while the material was still deposited on the anode. The hexane miscella thus treated that passed from the cylinder was very clear.

This example illustrates a method of de-oiling soya beans and of separating soya bean material from solution.

EXAMPLE III 100 g of dehulled soya beans were admixed with 300 g of hexane for 2 minutes in a WARING blender and then sieved through a 80 mesh TYLER TM screen. The undersized material i.e. that passing through the screen, was pumped through a glass cylinder equipped with a centrally located rod cathode and a cylindrical wire mesh anode at the circumference of the cylinder. A d.c. electric field of 15 kV (7.5 kV/cm) was applied across the electrodes. The hexane miscella passing through the cylinder was fed to the screen and recycled back through the cylinder.

The undersized material became deposited on the anode. The oversized material, which was retained on the screen, became very clean in appearance. The miscella became clear and free of visible particles in about one minute. After a period of time the hexane miscella was replaced with fresh hexane so as to wash the undersized material on the anode.

At the end of the run the hexane in the cylinder was drained off. The deposite of undersized material flowed out of the cylinder with the hexane.

The above procedure was repeated except that the admixture was formed from 100 g of rapeseed and 300 g of hexane which were admixed for 2 minutes in a WARING blender. A similar result was obtained.

EXAMPLE IV

A sample of proteinaceous material, dehulled if necessary, was comminuted in a knife mill using a 1 mm screen. A 25 g sample of the comminuted material was admixed with 250 g of FREON® 113 fluorocarbon solvent (trichlorotrifluoroethane) in a 400 ml beaker fitted with two electrodes. The electrodes were a cylindrical aluminum foil electrode and a centrally located electrode, of rolled aluminum foil, approximately 1 cm in diameter. A d.c. electric field of 20 kV (6.7 kV/cm) was applied across the electrodes.

When the proteinaceous material was sunflower seeds the material was attracted to the anode especially when the central electrode was the anode. In the latter case when the anode was withdrawn from the solvent the material remained adhered to the electrode. However when the cylindrical electrode was the anode the material did not remain adhered to the electrode when the electric field was discontinued.

When the proteinaceous material was soya beans, the so-called "spokes" were observed between the electrodes. When the cental electrode was the anode the material remained adhered to the electrode as the anode was withdrawn from the solvent.

This example illustrates that the process of the present invention is capable of being used with a liquid fluorocarbon as the solvent.

I claim:

1. A process for the separation of a comminuted fraction of proteinaceous material from an admixture thereof with an aliphatic hydrocarbon containing 5 to 8 carbon atoms or a normally liquid chlorofluorocarbon containing 1 or 2 carbon atoms, said proteinaceous material being selected from the group consisting of wheat, rye, barley, triticale, rice, peas, beans, soya beans, sesame seeds, peanuts, sunflower seed, whey powder, corn, rapeseed, sorghum, flax and buckwheat, comprising the steps of:
   (a) subjecting the admixture to the influence of a high voltage electric field, said admixture being in the form of a slurry and said electric field being formed between an anode and a cathode, and thereby depositing at least part of the comminuted fraction of proteinaceous material on at least the anode, and
   (b) separating the part so deposited from said admixture.

2. The process of claim 1 in which the high voltage electric field has an intensity in the range of about 1–20 kV/cm.

3. The process of claim 1 in which proteinaceous material is deposited on both the anode and the cathode.

4. The process of claim 1 in which proteinaceous material is only deposited on the anode.

5. The process of claim 2 in which the admixture of proteinaceous material and solvent is in the form of a slurry.

6. The process of claim 2 in which the proteinaceous material is admixed with the solvent in the form of a dispersion.

7. The process of claim 4 in which step (b) is followed by a step (c) in which the fraction deposited on the anode is contacted with solvent essentially free of oil.

8. The process of claim 1 in which the solvent is selected from the group consisting of pentane, hexane, heptane, cyclohexane and chlorofluorocarbons, and mixtures thereof.

9. The process of claim 2 in which the solvent is selected from the group consisting of pentane, hexane, heptane and cyclohexane, and mixtures thereof.

10. The process of claim 2 in which the solvent is a chlorofluorocarbon.

11. The process of claim 8 in which the high voltage electric field has an intensity in the range of about 5–15 kV/cm.

12. The process of claim 1 in which the proteinaceous material is soya beans.

13. The process of claim 1 in which the proteinaceous material is sunflower seeds.

14. The process of claim 1 in which the proteinaceous material is sesame seeds.

15. The process of claim 1 in which the proteinaceous material is peanuts.

16. The process of claim 1 in which the proteinaceous material is whey.

17. The process of claim 1 in which the proteinaceous material is barley.

18. The process of claim in which the proteinaceous material is buckwheat.

19. The process of claim 1 in which the proteinaceous material is corn.

20. The process of claim 1 in which the proteinaceous material is wheat.

21. The process of claim 1 in which the proteinaceous material is rapeseed.

22. The process of claim 1 in which the proteinaceous material is rice.

23. The process of claim 1 in which the proteinaceous material is sorghum.